UNITED STATES PATENT OFFICE.

JOSE BERRE KING, OF WEST BRIGHTON, NEW YORK.

MATERIAL FOR THE TREATMENT OF WALLS, &c.

SPECIFICATION forming part of Letters Patent No. 406,585, dated July 9, 1889.

Application filed April 24, 1889. Serial No. 308,494. (No specimens.)

*To all whom it may concern:*

Be it known that I, JOSE BERRE KING, a citizen of the United States, and a resident of West Brighton, in the county of Richmond and State of New York, have invented certain new and useful Improvements in Material for the Treatment of Walls and the Like, of which the following is a specification.

My invention relates to a composition of matter by which walls, ceilings, or the like can be treated, or from which busts, architectural works, &c., can be made, or which can be used in the arts and manufactures for any purpose which may be desired.

My invention consists in the composition of matter made from the ingredients hereinafter set forth, and pointed out in the claims.

I proceed for the production of my invention as follows: I take any mineral, earth, stone, or stone-like material, among the latter being marble, chalk, plaster, lime, or the like. Any one of these before-mentioned materials I grind, preferably reducing it to a fine powder. When I use lime, I, by preference, hydrate it by slaking it with water, thereby producing what is known as "hydrated lime." I then take this hydrated lime, dry it in any suitable manner, and grind or comminute it, preferably reducing it to a fine powder. I dissolve any animal, gelatinous, vegetable, glutinous, or saccharine matter, or any other substance which possesses the quality of acting as a restrainer of plaster in water, warm or cold, as may be preferred. There are a number of these substances now well known, and they do not require enumeration here. Of them all, however, for the purpose of this composition of matter, I prefer glue, because of a peculiarly beneficial result following its use, arising from a toughening and strengthening action, which renders the resulting wall material, whether a base-coat or a finish-coat, very strong and durable.

The restraining material, whatever it may be, as stated, I thoroughly mix with any of the finely-ground materials before set forth. More or less of the dissolved restraining material can be used, as desired.

To make what I call a "stronger product" more of the restraining material is used. To make a less strong product less of it is used. I have found that for ordinary purposes a mixture of, for example, four pounds of glue may be dissolved in a pailful of water. This fluid mass will wet about a certain amount of ground stone, (or any of the other materials set forth in their proper proportion,) not much more or less, so as to form a pasty mass. This pasty mass I then dry, either by artificial or natural heat and in such form as preferred, and the result will be a dry cake or crust-like mass. It might also be said, under certain conditions, to be a comparatively hard stone-like mass. Various drying methods may be used. I powder or finely divide this dried material in whatever form it may have been dried by grinding or in any other suitable way, and when this is done I have produced a powdered compound, which I call a "restrainer," and which is added to the materials hereinafter set forth to restrain the setting action.

I provide for the purpose of mixture, by preference, a mechanical mixer, in which I place plaster or like material, and then add the powdered restrainer in any desired quantity to restrain the setting action. I take any fibrous material—such as asbestus, mineral wool, or the like—and grind or comminute it to a comparatively fine powder. I prefer asbestus. This finely-divided fibrous material I place in the mixer, as before stated, in which has been previously placed the restrainer and plaster or like material, and thoroughly mix and combine them together, and after being so thoroughly mixed the resulting composition of matter may be placed in barrels or packages for shipment or dealt with as desired.

I have found by actual use that the addition of the above-described fibrous materials, especially asbestus, with the other materials set forth, renders the resulting wall material or plastic body more tenacious, strong, lighter, and possessing greater advantages than any other "plaster compound," so called, at present known to me, and among the most important and valuable of all the advantageous features obtained by its use are the hard and highly-polished surface it produces and the ease and quickness of its handling.

When this compound is to be used, it is preferable in all cases to intimately mix it with water while it is in a dry condition.

This compound is very useful not only for admixture with the materials forming the base or brown coat for walls and the like, but, under certain conditions and owing to the presence of the fibrous material, it may be employed as a single coat, taking the place of the base and finish coat, thus saving time, labor, and expense, and making a strong, durable, and light wall-covering.

Other materials—such as coloring-matter, sand, &c.—may be added to the compound; but these I do not claim herein.

What I claim, and desire to secure by Letters Patent, is—

1. The above-described composition of matter, composed, essentially, of a restraining material, ground stone or its equivalents, and a fibrous material—such as asbestus—as set forth.

2. The above-described composition of matter, composed, essentially, of a restraining material, ground stone or its equivalents, and a fibrous material—such as asbestus or its equivalents—reduced to a finely-divided condition and combined, as set forth.

Signed at West Brighton, in the county of Richmond and State of New York, this 15th day of April, A. D. 1889.

JOSE BERRE KING.

Witnesses:
W. W. CORBETT,
JOSEPH L. LEVY.